United States Patent
Hopkinson

(10) Patent No.: US 7,584,383 B2
(45) Date of Patent: Sep. 1, 2009

(54) METHOD AND SYSTEM FOR KERNEL-LEVEL DIAGNOSTICS USING A HARDWARE WATCHPOINT FACILITY

(75) Inventor: Carl Wayne Hopkinson, Algonquin, IL (US)

(73) Assignee: Sun Microsystems, Inc., Santa Clara, CA (US)

( * ) Notice: Subject to any disclaimer, the term of this patent is extended or adjusted under 35 U.S.C. 154(b) by 423 days.

(21) Appl. No.: 11/499,616

(22) Filed: Aug. 4, 2006

(65) Prior Publication Data

US 2008/0126866 A1    May 29, 2008

(51) Int. Cl.
G06F 11/00    (2006.01)
(52) U.S. Cl. .......................................... 714/35
(58) Field of Classification Search ................ 714/26, 714/32, 34, 35, 37–39, 42, 45–47, 51, 57; 717/124, 125, 127–129
See application file for complete search history.

(56) References Cited

U.S. PATENT DOCUMENTS

| 4,989,207 A | * | 1/1991 | Polstra | 714/29 |
| 6,983,452 B1 | * | 1/2006 | Willems | 717/128 |
| 7,185,183 B1 | * | 2/2007 | Uhler | 712/224 |
| 2004/0172219 A1 | * | 9/2004 | Curry, III | 702/186 |
| 2004/0172221 A1 | * | 9/2004 | Curry, III | 702/186 |
| 2007/0174353 A1 | * | 7/2007 | Adkins et al. | 707/202 |

* cited by examiner

Primary Examiner—Nadeem Iqbal
(74) Attorney, Agent, or Firm—Osha • Liang LLP

(57) ABSTRACT

A method for performing kernel-level diagnostics. The method includes obtaining a hardware trap associated with an attempt by a kernel-level instruction stream to access a memory address, wherein the memory address is referenced by a hardware watchpoint facility, forwarding the hardware trap to a software breakpoint handler, executing a diagnostic instruction defined by the software breakpoint handler to obtain diagnostic data, transmitting the diagnostic data to a user, and returning execution flow to the kernel-level instruction stream.

20 Claims, 3 Drawing Sheets

METHOD AND SYSTEM FOR KERNEL-LEVEL DIAGNOSTICS USING A HARDWARE WATCHPOINT FACILITY

BACKGROUND

In a typical computer system, a software operating system is configured to execute on system hardware. The operating system supports execution of user applications by providing an abstracted programmatic interface for using the system hardware (e.g., processor, memory, peripherals, etc.). Generally, the parts of the operating system providing this interface are referred to as the "kernel," or core, of the operating system.

Because user applications rely heavily on kernel functionality, it is important that the kernel contain as few "bugs" (i.e., programmatic errors), as possible. In particular, a kernel-level bug may result in failure of a user application and/or a failure of the operating system itself. In some cases, a failure of the operating system (sometimes referred to as an operating system "crash," or "kernel panic") may be so severe as to require restarting of the system hardware. Further, if a bug exists in an initialization instruction of the kernel, it may not be possible to fully initialize the operating system. Moreover, in some cases, a kernel-level bug may introduce data corruption into a user dataset, e.g., by erroneously writing to a memory location where the user dataset is stored. In such cases, the data corruption may not be immediately detected and/or may result in corrupt data being written to persistent storage. Accordingly, detrimental effects of the kernel-level bug may not be manifested until well after the kernel level-bug actually occurs.

To troubleshoot a kernel-level bug, a software breakpoint facility is typically used. Breakpoints are software instructions used to transfer execution flow to a software module referred to as a "breakpoint handler." A particular instruction is specified for the breakpoint, and when that instruction is reached, the breakpoint handler is executed. Specifically, the breakpoint handler executes diagnostic instructions to aid in identifying the source of the kernel-level bug.

In some cases, numerous instructions may be identified as potential sources of a kernel-level bug. Specifically, in such cases, due to the number of instructions in question, creating a breakpoint for each possible source of the kernel-level bug may be prohibitively time-consuming.

SUMMARY

In general, in one aspect, the invention relates to a method for performing kernel-level diagnostics. The method includes obtaining a hardware trap associated with an attempt by a kernel-level instruction stream to access a memory address, wherein the memory address is referenced by a hardware watchpoint facility, forwarding the hardware trap to a software breakpoint handler, executing a diagnostic instruction defined by the software breakpoint handler to obtain diagnostic data, transmitting the diagnostic data to a user, and returning execution flow to the kernel-level instruction stream.

In general, in one aspect, the invention relates to a system for performing kernel-level diagnostics. The system includes a hardware watchpoint facility configured to reference a memory address and a kernel diagnostics module configured to: obtain a hardware trap associated with an attempt by a kernel-level instruction stream to access the memory address, and forward the hardware trap to a software breakpoint handler configured to: execute a diagnostic instruction defined by the software breakpoint handler to obtain diagnostic data, transmit the diagnostic data to a user, and return execution flow to the kernel-level instruction stream.

In general, in one aspect, the invention relates to a computer readable medium comprising executable instructions for performing kernel-level diagnostics. The method includes obtaining a hardware trap associated with an attempt by a kernel-level instruction stream to access a memory address, wherein the memory address is referenced by a hardware watchpoint facility, forwarding the hardware trap to a software breakpoint handler, executing a diagnostic instruction defined by the software breakpoint handler to obtain diagnostic data, transmitting the diagnostic data to a user, and returning execution flow to the kernel-level instruction stream.

Other aspects of the invention will be apparent from the following description and the appended claims.

DETAILED DESCRIPTION

Figure 1:
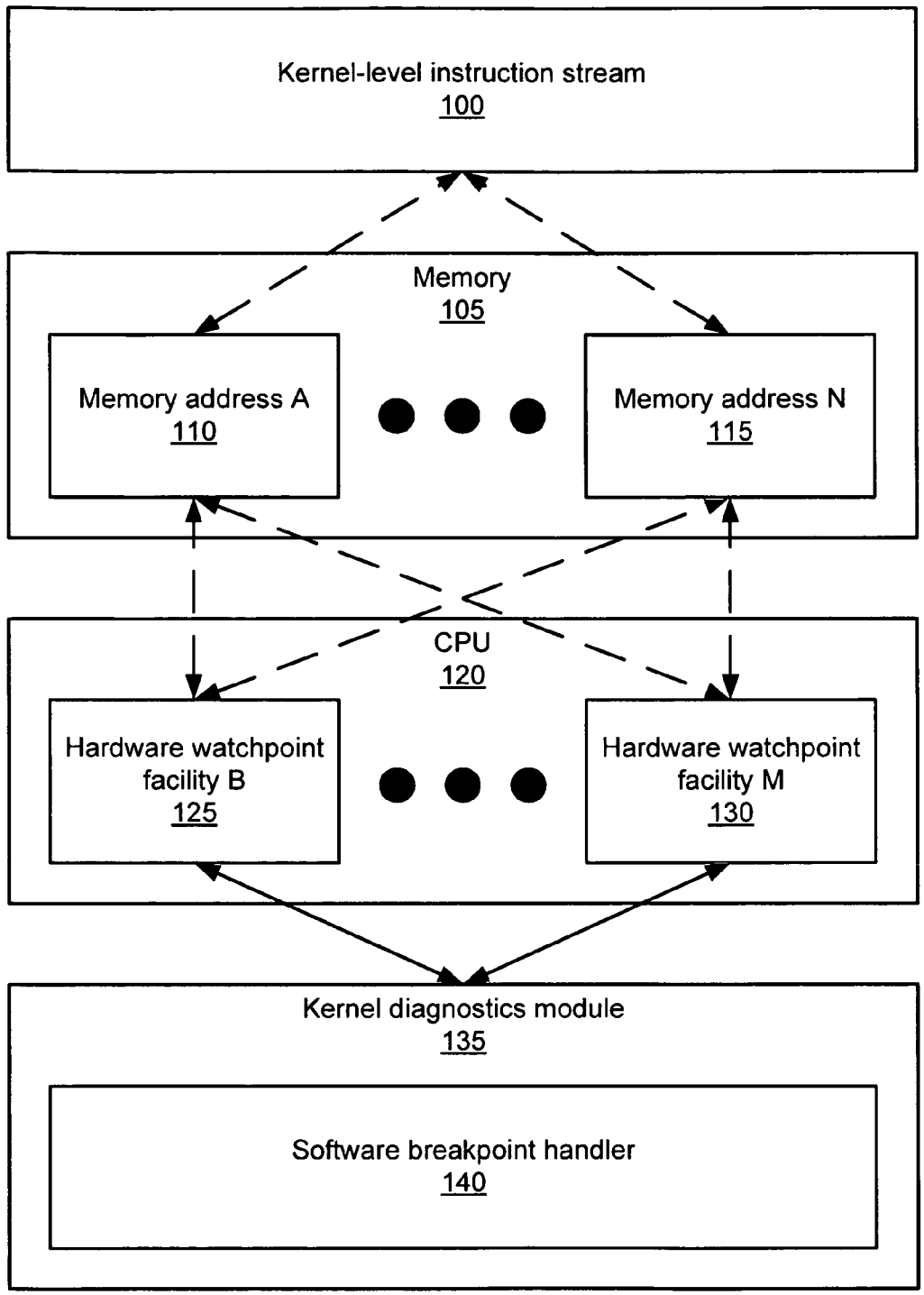
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for performing kernel-level diagnostics using a hardware watchpoint facility. The hardware watchpoint facility is configured to reference a particular memory address or range of memory addresses. If a kernel-level instruction stream attempts to access the referenced memory address, a hardware trap is generated. The hardware trap is forwarded to a software breakpoint handler, and a diagnostic instruction defined by the software breakpoint handler is executed.

While embodiments of the invention disclosed herein are discussed with respect to isolating kernel-level bugs, those skilled in the art will appreciate that one or more embodiments of the invention may be used for other purposes. For example, one or more embodiments of the invention may be used to determine an optimization path for a kernel-level instruction stream, to evaluate security features of a kernel, to research behavior of a kernel (e.g., in an educational setting), or for any other purpose wherein the use of hardware watchpoint facilities provides utility.

FIG. 1 shows a diagram of a system in accordance with one or more embodiments of the invention. Specifically, FIG. 1 shows a kernel-level instruction stream (100) configured to attempt to access one or more memory addresses (e.g., memory address A (110), memory address N (115)) in memory (105). In one or more embodiments of the invention, the kernel-level instruction stream (100) may include kernel initialization instructions, hardware interface instructions, any other type of kernel-level instructions, or any combination thereof. Further, in one or more embodiments of the invention, the memory (105) may include random access memory (RAM), read-only memory (ROM), flash memory, virtual memory, any other type of memory, or any combination thereof.

Continuing with discussion of FIG. 1, a central processing unit (CPU) (120) includes one or more hardware watchpoint facilities (e.g., hardware watchpoint facility B (125), hardware watchpoint facility M (130)), each configured to reference one or more of the memory addresses (e.g., 110, 115). In one or more embodiments of the invention, the CPU may be a Scalable Processor Architecture (SPARC®) processor. SPARC® is a registered trademark of SPARC International, Inc. Alternatively, the CPU may be any other type of CPU having a hardware watchpoint facility. Those skilled in the art will appreciate that the hardware watchpoint facilities(s) (e.g., 125, 130) may reference only a subset of the memory addresses (e.g., 110, 115) used by the kernel-level instruction stream (100). In one or more embodiments of the invention, the hardware watchpoint facilities (e.g., 125, 130) may be hardware registers. The concept of a register is well known in the art as a small amount of specialized physical memory. Alternatively, in one or more embodiments of the invention, the hardware watchpoint facilities (e.g., 125, 130) may be translation table entries (TTEs) in a memory management unit (MMU) (not shown). For example, in the SPARC® architecture, write-enable bits of TTEs may be disabled in the data translation lookaside buffer (DTLB) (not shown) of the MMU. Further, in one or more embodiments of the invention, a hardware address translation (HAT) layer (not shown) may be used as a caching and swapping mechanism for the TTEs. In one or more embodiments of the invention using a HAT layer to cache and swap references stored in TTEs may allow for a much larger number of references to be used.

In one or more embodiments of the invention, if an attempt to access one of the memory addresses (e.g., 110, 115) referenced by a hardware watchpoint facility (e.g., 125, 130) occurs, a hardware trap (not shown) is generated. A kernel diagnostics module (135) is configured to obtain the hardware trap and forward the hardware trap to a software breakpoint handler (140). In one or more embodiments of the invention, the kernel diagnostics module (135) may include software instructions, hardware instructions, or any combination thereof. For example, in one or more embodiments of the invention, the kernel diagnostics module (135) may be a kernel diagnostic framework that includes a breakpoint engine for installing and/or removing software breakpoints at runtime.

Further, as shown in FIG. 1, in one or more embodiments of the invention, the software breakpoint handler (140) may be a subcomponent of the kernel diagnostics module (135). Alternatively, in one or more embodiments of the invention, the software breakpoint handler (140) may be separate from the kernel diagnostics module (135), i.e., a software and/or hardware component logically separated from the kernel diagnostics module (135).

In one or more embodiments of the invention, the software breakpoint handler (140) is configured to execute one or more diagnostic instructions, based on receiving the hardware trap. For example, the diagnostic instruction(s) may be used to attempt to isolate a kernel-level bug, i.e., a bug that may be associated with the kernel-level instruction stream (100). Further, in one or more embodiments of the invention, the software breakpoint handler (140) may be configured to dynamically (i.e., at runtime) add and/or remove one or more instructions in the kernel-level instruction stream (100). Those skilled in the art will appreciate that adding an instruction may involve modifying an existing instruction, inserting a new instruction before or after an existing instruction, or any combination thereof. Addition and/or removal of instructions in a kernel-level instruction stream (e.g., 100) is discussed below.

Further, in one or more embodiments of the invention, the software breakpoint handler (140) is configured to reconfigure a hardware watchpoint facility (e.g., 125, 130) to reference a memory address (e.g., 110, 115) different from the memory address (e.g., 110, 115) previously referenced by the hardware watchpoint facility (e.g., 125, 130). In one or more embodiments of the invention, reconfiguring a hardware facility (e.g., 125, 130) may be performed directly by the software breakpoint handler (140), via another component (not shown) of the kernel diagnostics module (135), via any other hardware and/or software interface (not shown), or any combination thereof. Reconfiguration of a hardware watchpoint facility (e.g., 125, 130) is discussed below.

In one or more embodiments of the invention, the software breakpoint handler (140) and/or kernel diagnostics module (135) may include safety features to avoid invalid memory accesses or any other type of programmatic error in the diagnostic instruction(s). For example, the software breakpoint handler (140) and/or kernel diagnostics module (135) may include a limited set of programmatic functionality, may be implemented in a programming language that does not allow arbitrary direct memory access, may be protected by specialized fault handlers (e.g., to avoid generation of a second hardware trap or software breakpoint by the diagnostic instruction(s)), or include any other type of programmatic protection.

Further, in one or more embodiments of the invention, the software breakpoint handler (140) may be implemented using the C programming language or any other type of programming language suitable for kernel-level diagnostics. Those skilled in the art will appreciate that the use of C or a similar programming language may provide flexibility in the programmatic instructions available to a developer of the software breakpoint handler (140). For example, in one or more embodiments of the invention, pointer functionality provided by the C programming language may be used to dynamically determine a new memory address (e.g., 110, 115) for a hardware watchpoint facility (e.g., 125, 130). Further, in one or more embodiments of the invention, if the kernel is implemented in the same programming language as the software breakpoint handler (140), then one or more system functions provided by the kernel may be readily available for use by the software breakpoint handler (140). Those skilled in the art will appreciate that if C or another similar programming language is used, it may be possible to provide additional safety features programmatically.

In one or more embodiments of the invention, the software breakpoint handler (140) is configured to return execution flow to the kernel-level instruction stream (100) after executing the diagnostic instruction(s). Returning execution flow to a kernel-level instruction stream (e.g., 100) is discussed below.

Figure 2:
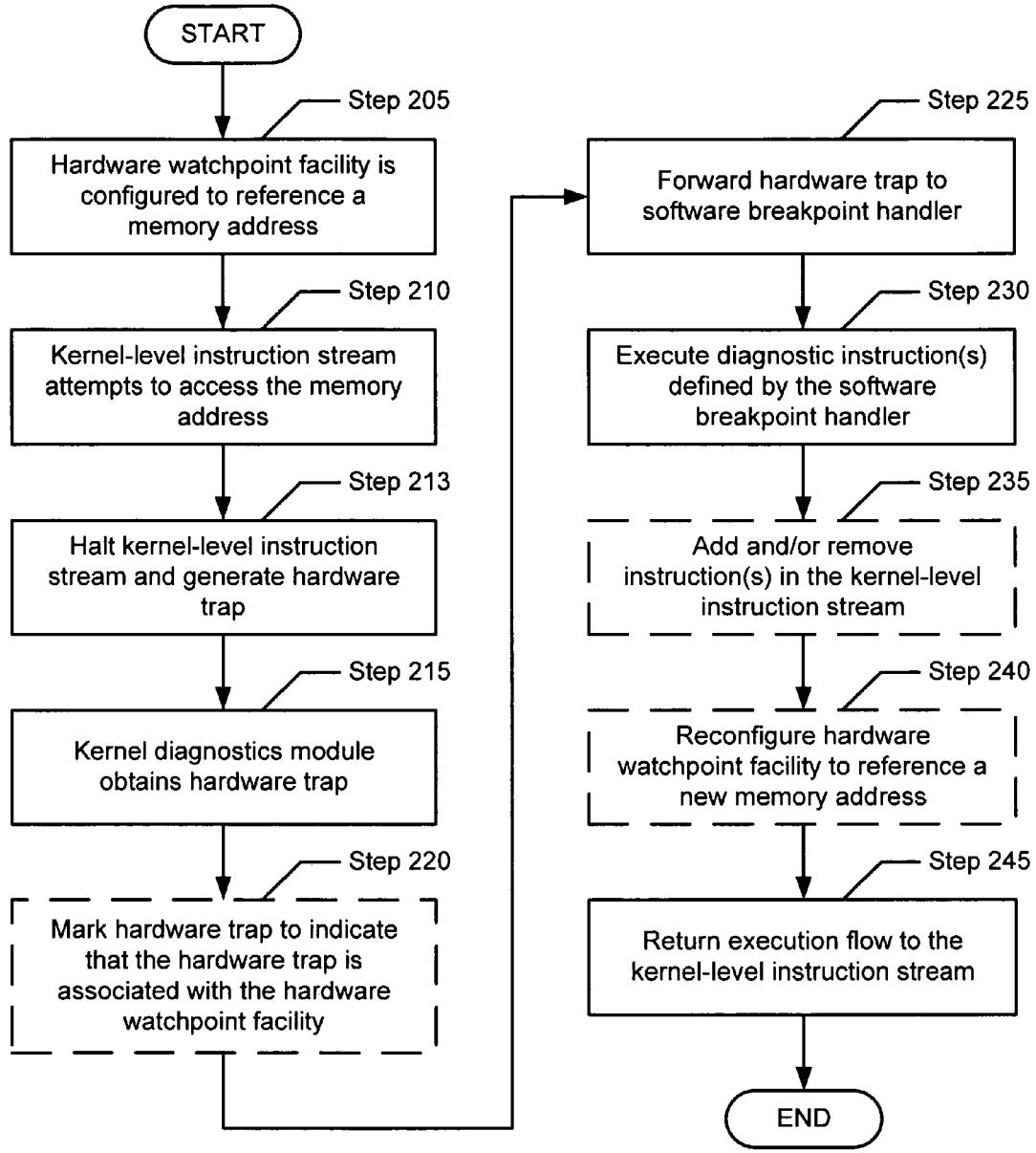
FIG. 2 shows a flowchart in accordance with one or more embodiments of the invention.

FIG. 2 shows a flowchart in accordance with one or more embodiments of the invention. Specifically, FIG. 2 shows a flowchart of a method for performing kernel-level diagnostics using a hardware watchpoint facility, in accordance with one or more embodiments of the invention. Initially, a hardware watchpoint facility is configured to reference a memory address (Step 205). In one or more embodiments of the invention, the hardware watchpoint facility may be configured using a kernel-level process, a software breakpoint handler, a basic input/output system (BIOS) instruction, any other suitable process, or any combination thereof. For example, in one or more embodiments of the invention, the hardware watchpoint facility may be configured in an initialization routine of a kernel diagnostics module (e.g., kernel diagnostics module (135) of FIG. 1).

Next, a kernel-level instruction stream attempts to access the memory address referenced by the hardware watchpoint facility (Step 210). Specifically, an instruction in the kernel-level instruction stream attempts to access the referenced memory address. In one or more embodiments of the invention, the attempt to access the memory address may involve attempting to read the memory address, write to the memory address, or any combination thereof. In one or more embodiments of the invention, after the kernel-level instruction stream attempts to access the reference memory address (i.e., Step 210), the kernel-level instruction stream is halted and a hardware trap is generated (Step 213). Specifically, the instruction that attempted to access the referenced memory address is not allowed to complete. In one or more embodiments of the invention, the hardware trap may involve a hardware signal, a software signal, or any combination thereof, indicating that an attempt to access the referenced memory address occurred. For example, in a SPARC® architecture, the hardware trap may be a physical address watchpoint trap (e.g., trap 0×61 or any other similar hardware trap).

Next, the hardware trap is obtained by a kernel diagnostics module (Step 215) and forwarded to a software breakpoint handler (Step 225). For example, in a SPARC® architecture, a physical address watchpoint trap (e.g., trap 0×61, etc.) may result in execution flow being transferred to trap-handling instructions. In one or more embodiments of the invention, the trap-handling instructions to which execution is transferred may be the same instructions that handle software breakpoint traps. Accordingly, in one or more embodiments of the invention, the trap-handling instructions may handle the watchpoint trap in a substantially similar manner as a software breakpoint trap.

Specifically, in one or more embodiments of the invention, forwarding the hardware trap to the software breakpoint handler (i.e., Step 225) may involve forwarding a reference to an execution context (e.g., register contents, etc.) for the kernel-level instruction stream and/or a reference identifying the hardware watchpoint facility. Those skilled in the art will appreciate that a reference to an execution context may provide useful details about the specific instruction that attempted to access the referenced memory address. For example, in one or more embodiments of the invention, the execution context may include a stack trace for the instruction, values for any variables referenced by the instruction, any other type of contextual information, or any combination thereof. Further, those skilled in the art will appreciate that a reference identifying the hardware watchpoint facility may be useful to determine which memory address the attempt involved. Further, in one or more embodiments of the invention, the reference identifying the hardware watchpoint facility may be used to reconfigure the hardware watchpoint facility. Reconfiguration of watchpoint facilities is discussed below.

Returning to discussion of FIG. 2, in one or more embodiments of the invention, the software breakpoint handler may be configured to differentiate between hardware traps and software breakpoint traps. Accordingly, in one or more embodiments of the invention, prior to forwarding the hardware trap to the software breakpoint handler (i.e., Step 225), the hardware trap may be marked to indicate that the hardware trap is associated with a hardware watchpoint facility, versus a software breakpoint trap (Step 220). In one or more embodiments of the invention, the marking may involve a special parameter passed to the software breakpoint handler in conjunction with the hardware trap, a data modification of the hardware trap itself, or any combination thereof.

After the software breakpoint handler receives the marked or unmarked hardware trap, the software breakpoint handler executes one or more diagnostic instructions (Step 230). In one or more embodiments of the invention, the diagnostic instruction(s) may be directed to attempting to isolate a kernel-level bug. For example, if a reference to an execution context is available, as discussed above, then the execution context may be used to isolate a specific instruction and/or segment of code that is responsible for the bug. Specifically, in one or more embodiments of the invention, the diagnostic instruction(s) may generate diagnostic data associated with the kernel. Those skilled in the art will appreciate that many different types of diagnostic instructions may be used.

Further, in one or more embodiments of the invention, the diagnostic instruction(s) may be used to transmit diagnostic data to a user. In one or more embodiments of the invention, the user may use the diagnostic data to debug the kernel, optimize the kernel, research the kernel, or any other similar type of action using the diagnostic data. In one or more embodiments of the invention, the diagnostic data may be transmitted graphically (e.g., on a computer display), aurally (e.g., using a speaker to transmit voice data, a beep, etc.), in a data file (e.g., a file stored on a hard disk, flash memory, etc.), or by any other similar method. Those skilled in the art will appreciate that transmitting the diagnostic data may be performed indirectly, i.e., via a software interface or hardware interface other than the software breakpoint handler. For example, a graphics library, file access function, hardware display interface, application program interface (API), or any other similar type of interface may be used to transmit the diagnostic data to the user.

Continuing with discussion of FIG. 2, in one or more embodiments of the invention, the software breakpoint handler may add and/or remove instructions in the kernel-level instruction stream (Step 230), e.g., as part of the diagnostic instruction(s) executed in Step 230. Those skilled in the art will appreciate that runtime modification of the kernel-level instruction stream may allow for one or more of the following: dynamic insertion of one or more diagnostic instructions into the kernel-level instruction stream, dynamic removal of one or more suspect instructions from the kernel-level instruction stream, bypassing of one or more instructions in the kernel-level instruction stream, any other similar type of modification to the kernel-level instruction stream, or any combination thereof.

Further, in one or more embodiments of the invention, the software breakpoint handler may reconfigure a hardware watchpoint facility (i.e., the hardware watchpoint facility associated with the hardware trap, or any other hardware watchpoint facility) to reference a new memory address (Step 240), e.g., as part of the diagnostic instruction(s) executed in Step 230. For example, in a SPARC® architecture, watchpoint configuration bits in a Data Cache Unit Control Register (DCUCR) may be reconfigured. Specifically, a Data Cache Unit (DCU) physical watchpoint mask, a DCU virtual watchpoint mask, a DCU physical watchpoint enable bit, and/or a DCU virtual watchpoint enable bit may be reconfigured to indicate which memory address(es) should be monitored. Detailed discussion of DCUCR reconfiguration can be found in the UltraSPARC® III Cu User's Manual, Version 2.2.1, January 2004. Continuing with the example, in some cases, only physical watchpoint masks may be used, and any virtual addresses may be converted to their corresponding physical addresses. In one or more embodiments of the invention, converting virtual addresses to their corresponding physical addresses may avoid the possibility of userland (i.e., non-kernel) processes erroneously triggering watchpoint traps. Those skilled in the art will appreciate that dynamic reconfiguration of a hardware watchpoint facility may allow for referencing of a memory address that is determined dynamically and/or based on dynamic system state. For example, if the hardware watchpoint facility is initially configured in an initialization routine of a kernel diagnostics module, as discussed above, the hardware watchpoint facility may be reconfigured based on system state that is not available to the initialization routine. Further, those skilled in the art will appreciate that dynamic reconfiguration of a hardware watchpoint facility may allow for simulation of a larger number of hardware watchpoint facilities than those physically available in the CPU.

Those skilled in the art will appreciate that Steps 230, 235, and 240 may overlap. For example, one or more of Steps 235 and/or 240 may be the only diagnostic instruction(s) executed by the software breakpoint handler. Further, in one or more embodiments of the invention, specific instructions associated with Steps 230, 235, and/or 240 may be intermingled. Moreover, in one or more embodiments of the invention, Steps 230, 235, and 240 may be performed in any order and/or in parallel.

After Steps 230, 235 and/or 240 are complete, execution flow is returned to the kernel-level instruction stream (Step 245). In one or more embodiments of the invention, returning execution flow to the kernel-level instruction stream may involve disabling the watchpoint facility associated with the instruction that attempted to access the referenced memory address (i.e., the instruction of Step 210) so that the instruction can execute without re-triggering the watchpoint trap. For example, in a SPARC® architecture, if the hardware watchpoint facility is a translation table entry (TTE), a write-enable bit associated with the TTE may be enabled, to allow the instruction to execute. Further, in one or more embodiments of the invention, a hardware watchpoint or software breakpoint may be associated with the next instruction to be executed, so that the disabled watchpoint facility can be re-enabled. Alternatively, in one or more embodiments of the invention, returning execution flow to the kernel-level instruction stream may involve simulating the instruction that attempted to access the referenced memory address. Specifically, simulation of the instruction may be required to avoid recreating the same hardware trap. Further, if an instruction has been added and/or removed in the kernel-level instruction stream, then execution flow may be returned to the modified kernel-level instruction stream.

Further, in one or more embodiments of the invention, one or more diagnostic instructions of the software breakpoint handler may have modified the values of a program counter (PC) and/or next program counter (NPC) associated with the CPU. Those skilled in the art will appreciate that if the values of a PC and/or NPC are modified, execution flow may be transferred to a new location in the instruction stream. For example, a "long jump" may be performed, transferring execution flow to a different instruction, subroutine, or version of a subroutine. Those skilled in the art will appreciate that performing a long jump or similar transfer to a new location of the execution stream may further enhance the diagnostic capabilities of the invention.

Those skilled in the art, having the benefit of the present disclosure, will appreciate that one or more embodiments of the invention may provide the ability to intermingle hardware watchpoints and software breakpoints. For example, a hardware watchpoint facility may be reconfigured based on accessing a specific software breakpoint, or vice-versa. Further, one or more embodiments of the invention may facilitate troubleshooting of kernel-level bugs, e.g., as discussed above.

Figure 3:
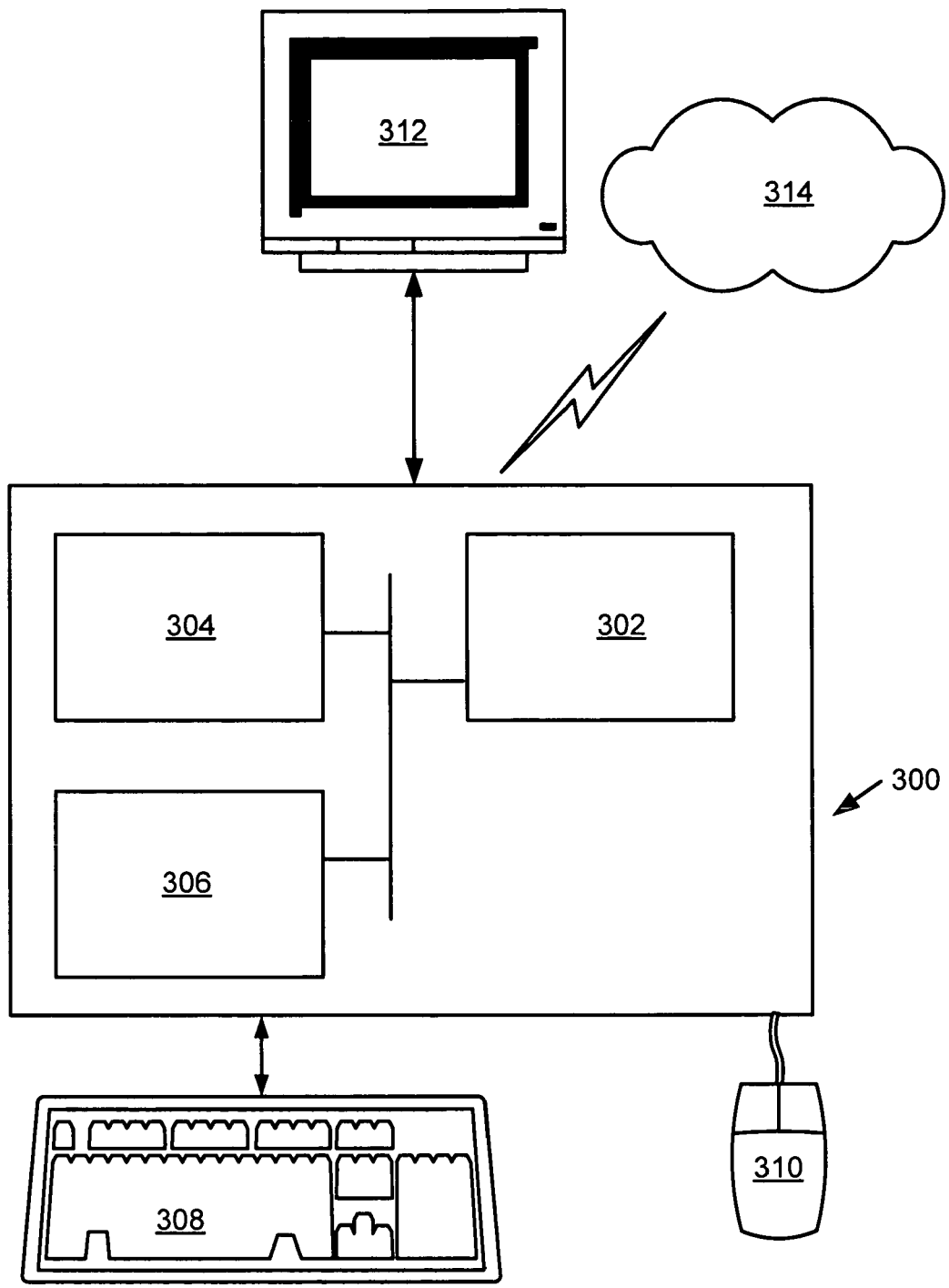
FIG. 3 shows a diagram of a computer system in accordance with one or more embodiments of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) may be connected to a network (314) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., kernel-level instruction stream, memory, hardware watchpoint facility, kernel diagnostics module, software breakpoint handler, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing kernel-level diagnostics, comprising:
    obtaining a hardware trap associated with an attempt by a kernel-level instruction stream to access a memory address, wherein the memory address is referenced by a hardware watchpoint facility;
    forwarding the hardware trap to a software breakpoint handler;
    executing a diagnostic instruction defined by the software breakpoint handler to obtain diagnostic data;
    transmitting the diagnostic data to a user; and
    returning execution flow to the kernel-level instruction stream.

2. The method of claim 1, further comprising:
    reconfiguring the hardware watchpoint facility to reference a new memory address, prior to returning execution flow to the kernel-level instruction stream.

3. The method of claim 1, further comprising:
    adding an instruction to the kernel-level instruction stream, by the software breakpoint handler, to obtain a modified kernel-level instruction stream,
    wherein returning execution flow to the kernel-level instruction stream comprises transferring execution flow to the modified kernel-level instruction stream.

4. The method of claim 1, wherein forwarding the hardware trap to the software breakpoint handler comprises:
  marking the hardware trap to obtain a marked hardware trap, wherein the marking indicates that the hardware trap is associated with the hardware watchpoint facility; and
  forwarding the marked hardware trap to the software breakpoint handler.

5. The method of claim 1, wherein forwarding the hardware trap to the software breakpoint handler comprises forwarding a first reference identifying a context of the kernel-level instruction stream and a second reference identifying the hardware watchpoint facility.

6. The method of claim 1, wherein the attempt to access the memory address is halted prior to obtaining the hardware trap, and wherein returning execution flow to the kernel-level instruction stream comprises completing the attempt to access the memory address.

7. The method of claim 1, wherein the kernel-level instruction stream comprises a kernel initialization instruction stream.

8. The method of claim 1, wherein the hardware watchpoint facility comprises a plurality of translation table entries in a memory management unit.

9. The method of claim 1, wherein the hardware watchpoint facility comprises a hardware watchpoint register.

10. A system for performing kernel-level diagnostics, comprising:
  a hardware watchpoint facility configured to reference a memory address; and
  a kernel diagnostics module configured to:
    obtain a hardware trap associated with an attempt by a kernel-level instruction stream to access the memory address, and
    forward the hardware trap to a software breakpoint handler configured to:
      execute a diagnostic instruction defined by the software breakpoint handler to obtain diagnostic data,
      transmit the diagnostic data to a user, and
      return execution flow to the kernel-level instruction stream.

11. The system of claim 10, wherein the software breakpoint handler is further configured to:
  reconfigure the hardware watchpoint facility to reference a new memory address, prior to returning execution flow to the kernel-level instruction stream.

12. The system of claim 10, wherein the software breakpoint handler is further configured to:
  add instructions to the kernel-level instruction stream, to obtain a modified kernel-level instruction stream,
  wherein returning execution flow to the kernel-level instruction stream comprises transferring execution flow to the modified kernel-level instruction stream.

13. The system of claim 10, wherein forwarding the hardware trap to the software breakpoint handler comprises:
  marking the hardware trap to obtain a marked hardware trap, wherein the marking indicates that the hardware trap is associated with the hardware watchpoint facility; and
  forwarding the marked hardware trap to the software breakpoint handler.

14. The system of claim 10, wherein forwarding the hardware trap to the software breakpoint handler comprises forwarding a first reference identifying a context of the kernel-level instruction stream and a second reference identifying the hardware watchpoint facility.

15. The system of claim 10, wherein the attempt to access the memory address is halted prior to obtaining the hardware trap, and wherein returning execution flow to the kernel-level instruction stream comprises completing the attempt to access the memory address.

16. The system of claim 10, wherein the software breakpoint handler is a subcomponent of the kernel diagnostics module.

17. The system of claim 10, wherein the kernel-level instruction stream comprises a kernel initialization instruction stream.

18. The system of claim 10, wherein the hardware watchpoint facility comprises a plurality of translation table entries in a memory management unit.

19. The system of claim 10, wherein the hardware watchpoint facility comprises a hardware watchpoint register.

20. A computer readable storage medium comprising executable instructions for performing kernel-level diagnostics by:
  obtaining a hardware trap associated with an attempt by a kernel-level instruction stream to access a memory address, wherein the memory address is referenced by a hardware watchpoint facility;
  forwarding the hardware trap to a software breakpoint handler;
  executing a diagnostic instruction defined by the software breakpoint handler to obtain diagnostic data;
  transmitting the diagnostic data to a user; and
  returning execution flow to the kernel-level instruction stream.

* * * * *

UNITED STATES PATENT AND TRADEMARK OFFICE
CERTIFICATE OF CORRECTION

PATENT NO. : 7,584,383 B2
APPLICATION NO. : 11/499616
DATED : September 1, 2009
INVENTOR(S) : Carl Wayne Hopkinson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 451 days.

Signed and Sealed this

Fourteenth Day of September, 2010

David J. Kappos
*Director of the United States Patent and Trademark Office*